Apr. 17, 1923.

J. A. BAUMGARTNER

MEAT CUTTING MACHINE

Filed Apr. 10, 1922

INVENTOR.
John A. Baumgartner
BY George J. Ottsch
ATTORNEY.

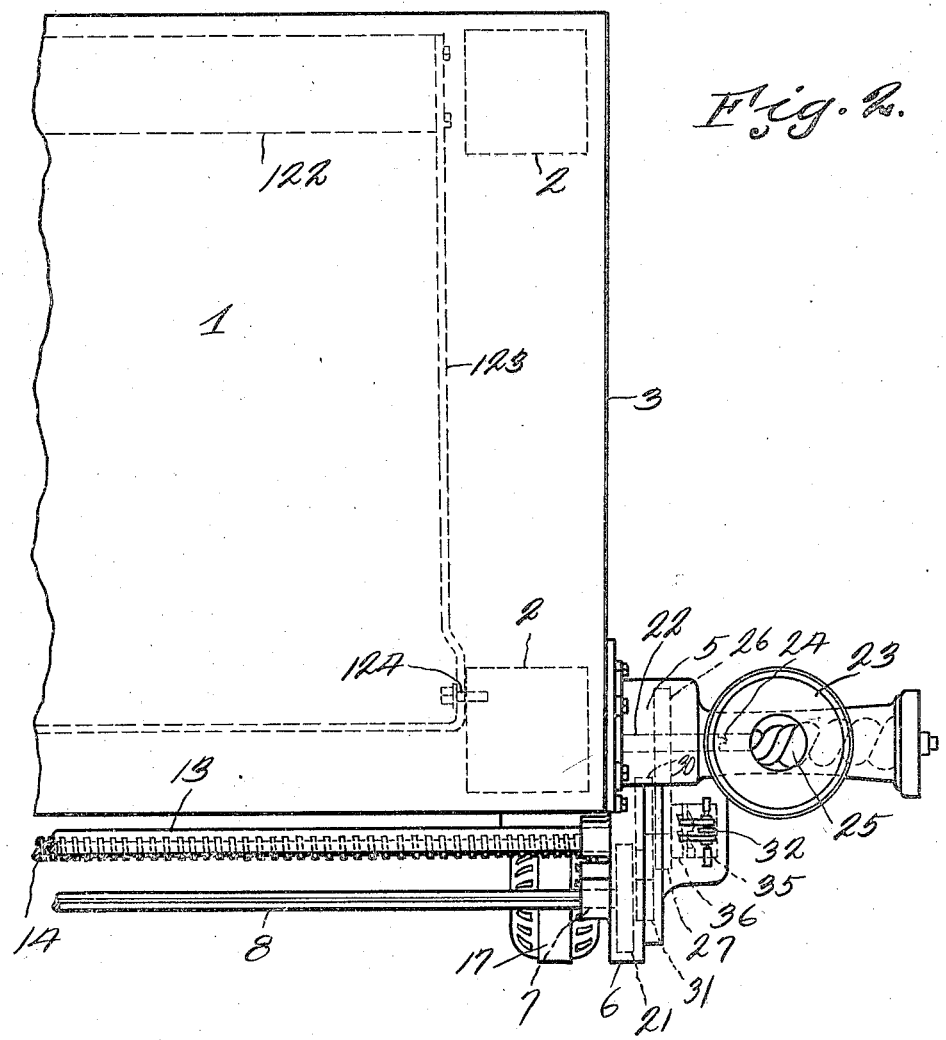

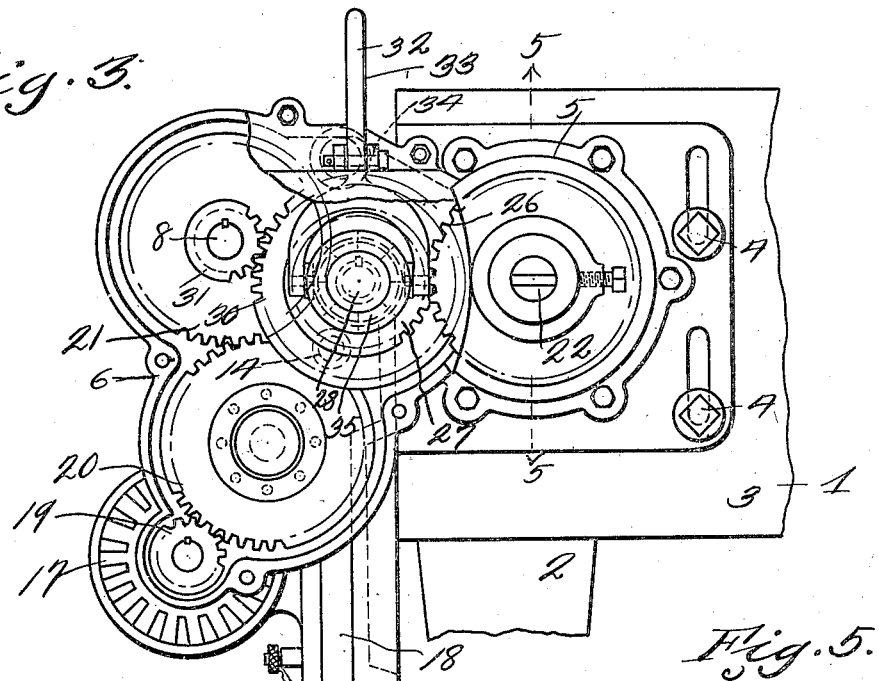
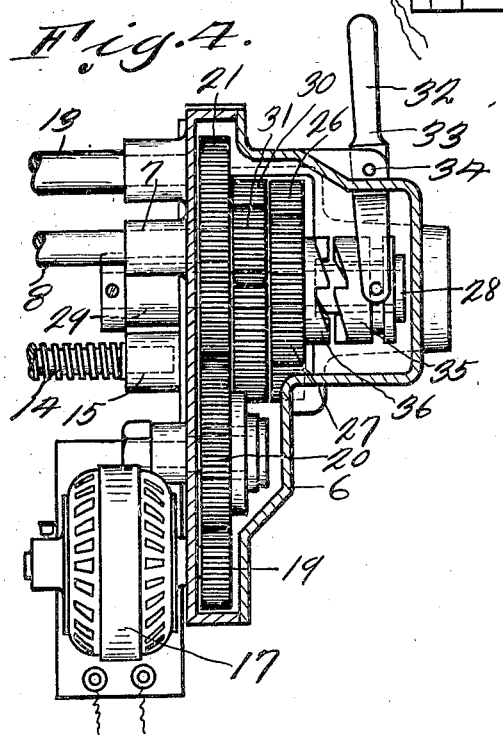
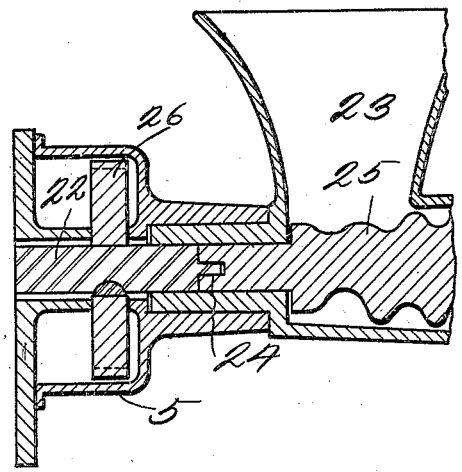

Apr. 17, 1923.
J. A. BAUMGARTNER
MEAT CUTTING MACHINE
Filed Apr. 10, 1922 6 sheets-sheet 4
1,451,675
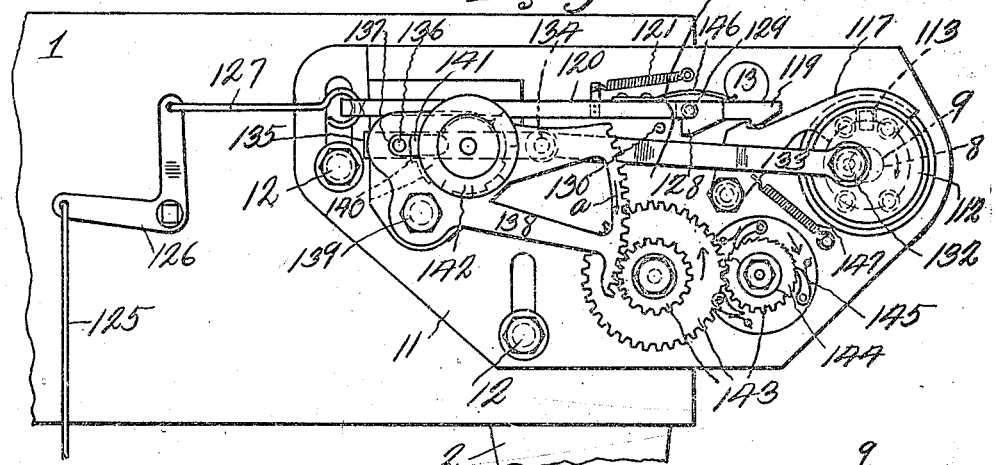
Fig. 6.
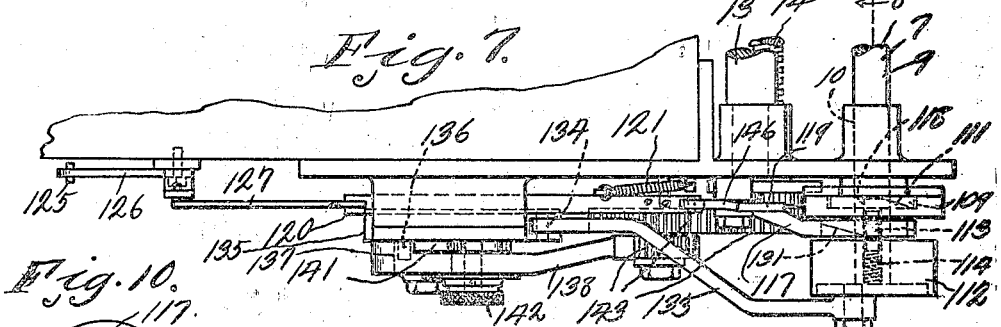
Fig. 7.
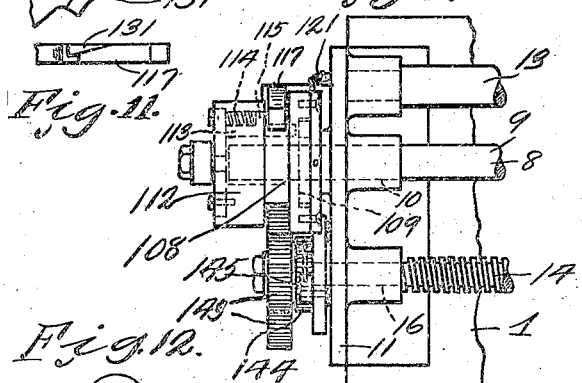
Fig. 10.
Fig. 8.
Fig. 11.
Fig. 12.
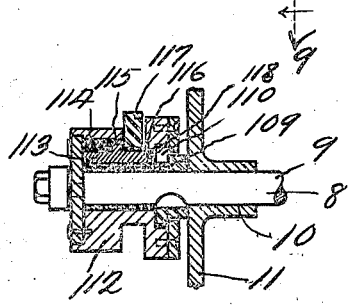
Fig. 9.
INVENTOR.
John A. Baumgartner
BY
George J. Ottoh
ATTORNEY.

Apr. 17, 1923.

J. A. BAUMGARTNER

MEAT CUTTING MACHINE

Filed Apr. 10, 1922

INVENTOR
John A. Baumgartner
By George J Ottsch
ATTORNEY

Patented Apr. 17, 1923.

1,451,675

UNITED STATES PATENT OFFICE.

JOHN A. BAUMGARTNER, OF SOUTH BEND, INDIANA.

MEAT-CUTTING MACHINE.

Application filed April 10, 1922. Serial No. 551,250.

*To all whom it may concern:*

Be it known that I, JOHN A. BAUMGARTNER, a citizen of the United States, residing at South Bend, in the county of St. Joseph and State of Indiana, have invented certain new and useful Improvements in Meat-Cutting Machines, of which the following is a specification.

The invention relates to meat cutting machines, and has for its object to produce a device of this character wherein a carriage is intermittently movable adjacent one side of a meat cutting bench and provided with a reciprocating meat severing element, the reciprocation of which may be controlled at will by the operator.

A further object is to provide controllable means whereby the carriage may be moved predetermined distances, thereby allowing slices of desired thickness to be cut from a carcass located on the bench.

A further object is to provide a constantly driven shaft extending through the carriage and controllable clutch means cooperating with gear connections and a pitman connection whereby the meat severing element frame may be reciprocated at will. Also to pivotally mount the carriage, which carries the meat severing element frame, in such a manner that said carriage may be moved longitudinally on guiding members, thereby allowing the carriage to be quickly positioned in any desired position, independent of the feeding mechanism and the spacing mechanism.

A further object is to provide severing elements comprising a saw and a knife carried by a frame pivotally mounted in the severing element frame and constructed in such a manner that the knife or saw may be positioned and held in position for sawing or cutting as desired, said saw forming means whereby bones may be severed.

A further object is to provide a meat severing machine comprising a meat severing block, a feed screw, guide bars on which feed screw and guide bars a meat severing element carriage is longitudinally movable, one of the guide bars being a constantly driven shaft and driven through gear connections with a motor carried by the block. The carriage is provided with means for supporting a severing element frame and with gear and pitman connections between the constantly driven shaft and the frame which gear connections are clutch controlled. Also to provide, adjacent one end of the constantly driven shaft, means whereby the feed screw may be rotated for spacing the carriage a predetermined distance and controllable clutch means between the spacing means and the constantly driven shaft whereby the rotation of the feed screw may be accomplished.

A further object is to provide in combination with the gear connections between the motor and the constantly rotated shaft, gear means whereby auxiliary machinery may be operated, such for instance as a meat grinder or a rotary block cleaning brush, said gear means being clutch controlled.

A further object is to provide the carriage with a spring actuated pivoted dog, one end of which engages between the thread of the feed screw and forms means whereby the carriage will be moved longitudinally upon rotation of the feed screw. Also to provide the carriage with a lug positioned whereby upon extreme rearward tilting of the carriage, the spring actuated dog will be engaged and forced out of cooperation with the feed screw, thereby allowing the carriage to be moved longitudinally on the constantly driven shaft, the guide rod and the feed screw to any desired position. Also to position the lug whereby upon a partial tilting rearwardly of the carriage the spring actuated dog will not be engaged, thereby allowing limited vertical pivotal action of the carriage and severing element frame without rendering the feed screw mechanism inoperative.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 2 is a top plan view of the other side of the block and the meat severing machine.

Figure 3 is an end view of one end of the meat severing machine and a portion of the block, showing the gear connections between the motor, the constantly driven shaft and the auxiliary machinery driving gear, the casing plate being broken away to better show the structure.

Figure 4 is a rear view of one end of the machine, showing the gear connections from the motor, the casing being broken away to better show the structure.

Figure 5 is a sectional view through the meat grinding machine taken on line 5—5 of Figure 3.

Figure 6 is a view in elevation of the end of the machine opposite to that shown in Figure 3, and showing the spacing controlling mechanism for the carriage.

Figure 7 is a top plan view of the spacing controlling mechanism.

Figure 8 is a rear view of the spacing controlling mechanism.

Figure 9 is a detail sectional view through the spacing mechanism taken on line 9—9 of Figure 7.

Figure 10 is a detail view of a portion of the spacing clutch controlling lever.

Figure 11 is a bottom plan view of one end of the lever controlling the spacing clutch.

Figure 12 is a side elevation of the spacing regulating cam.

Figure 1:
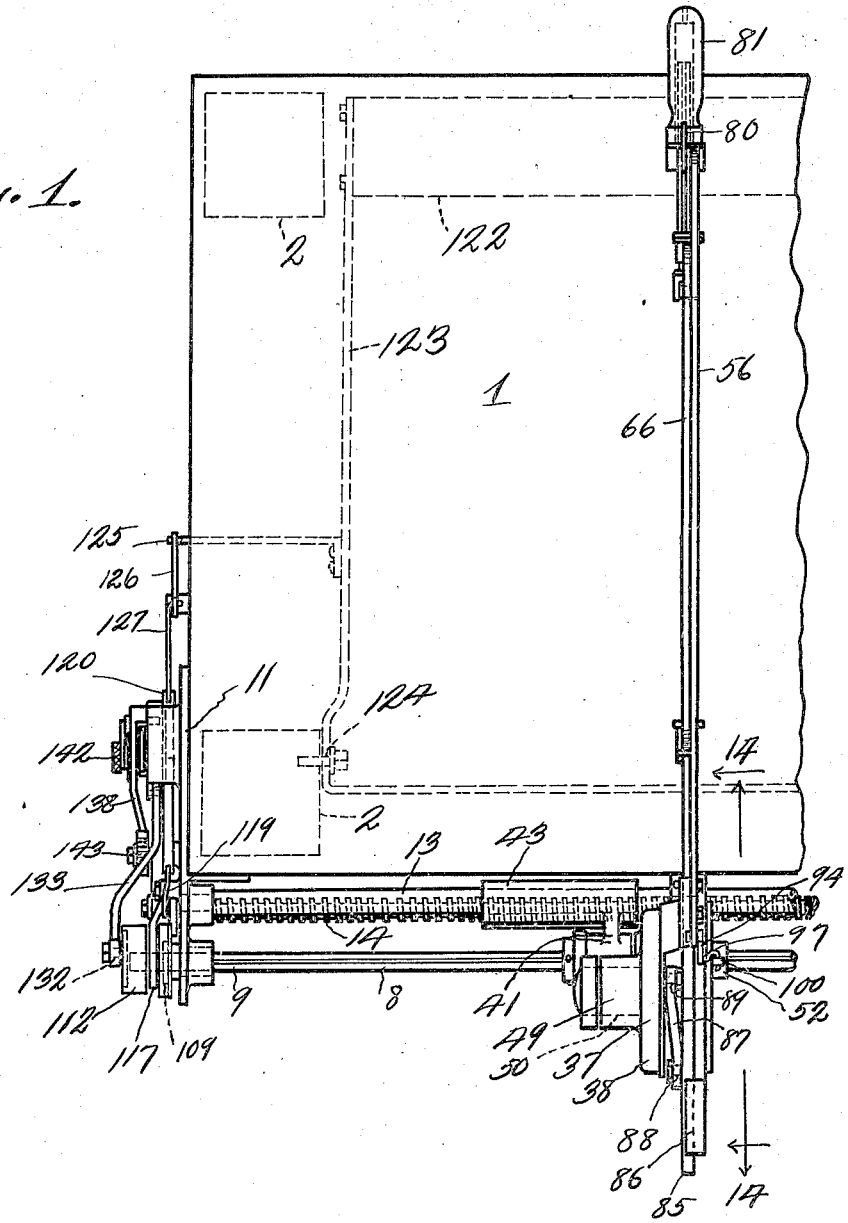
Figure 1 is a top plan view of one side of the meat block and meat severing machine applied thereto.
Figure 13:
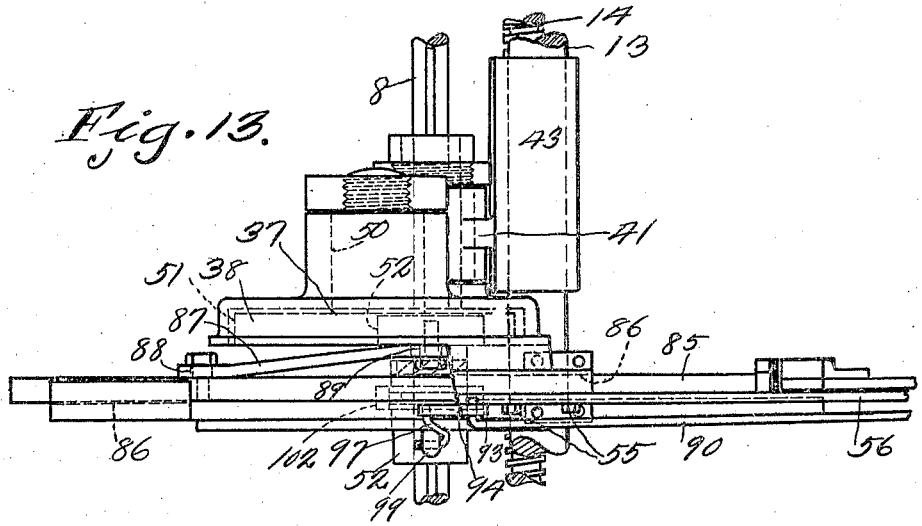
Figure 13 is a top plan view of the carriage.
Figure 14:
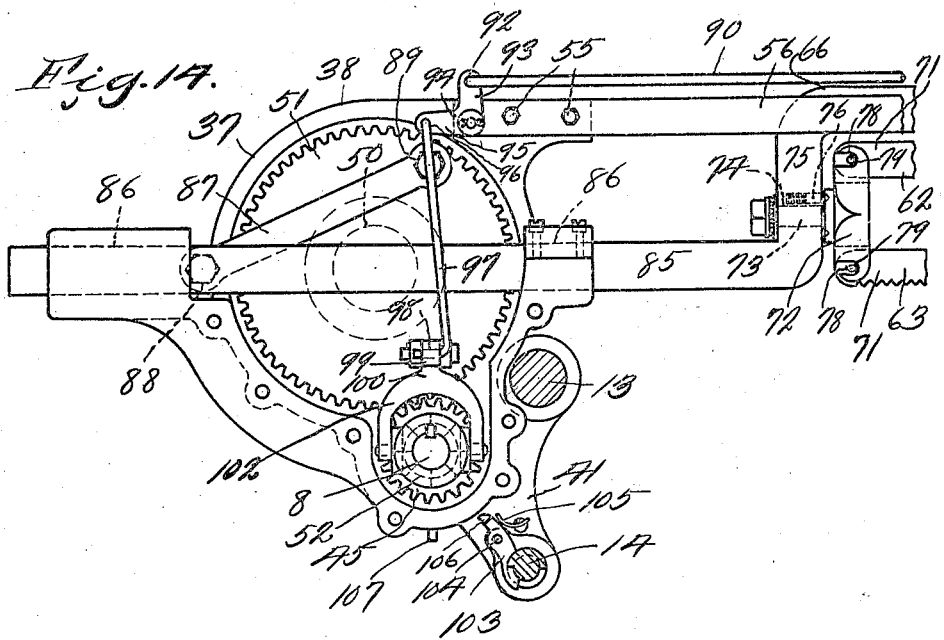
Figure 14 is a sectional view taken on line 14—14 of Figure 1 and showing the carriage in side elevation.

Referring to the drawings, the numeral 1 designates a horizontally disposed meat supporting block of a conventional type. The block 1 is preferably rectangular shape as shown and supported adjacent its corners by supporting legs 2. Secured to the side 3 of the block 1 by means of bolts 4 is a casing 5 which is provided with an extension casing 6, in a bearing 7 of which a constantly rotated shaft 8 is mounted, said shaft having its end 9 rotatably mounted in a bearing 10 in a plate 11 secured to the opposite side of the block 1 to the side 3 by means of bolts 12. The plate 11 and the extension casing 6 are connected together by a guide rod 13 which is in parallel relation to the constantly driven shaft 8, and forms a guide for a traversing carriage hereinafter set forth. Disposed below the guide rod 13 is a feed screw 14, which is intermittently rotated by mechanism hereinafter set forth, said feed screw having one of its ends rotatably mounted in a bearing 15 carried by the casing extension 6 and its other end rotatably mounted in a bearing 16 carried by the plate 11. The constantly driven shaft 8 is driven by an electric motor 17, mounted on a downwardly extending extension 18 of the casing extension 6 and has its axis in parallel relation to the constantly driven shaft 8 and constantly drives the shaft 8 through the gear 19, idle gear 20 and the gear 21 secured to the shaft 8, therefore it will be seen that the drive shaft 8 will be constantly rotated during the operation of the motor 17. The casing 5 is provided with an auxiliary machinery driven shaft 22 and is adapted to operative auxiliary machinery, such for instance as a meat grinding machine 23, which is shown. Shaft 22 has a dove-tail connection 24 with the grinding worm 25 of the meat grinding machine. Secured to the shaft 22 is a gear 26, which gear meshes with a gear 27 rotatably mounted on a countershaft 28, which countershaft is rotatably mounted in a bearing 29 of the casing extension 6. The gear 27 being rotatably mounted on the countershaft 28, it will be seen that when the gear 30, which is fixed to the countershaft 28 is rotated through the medium of the gear 31 carried by the drive shaft 8, the shaft 22 will not be rotated. However when it is desired to rotate the shaft 22 and consequently operate the meat grinding machine 23 the operator grasps the handle 32, carried by the lever 33, which is pivoted at 34 to the casing extension 6 and forces the same outwardly, thereby causing the clutch member 35 which is slidably keyed on the shaft 28 to move inwardly into engagement with the clutch member 36 carried by the gear 27, thereby locking the gear 27 to the shaft 28 and consequently during the rotation of the shaft 28 imparting rotary movement to the shaft 22 through the gear 26. Although a meat grinding machine 23 is shown, it is to be understood that other auxiliary machinery may be operated by attaching the same to the shaft 22.

Figure 15:
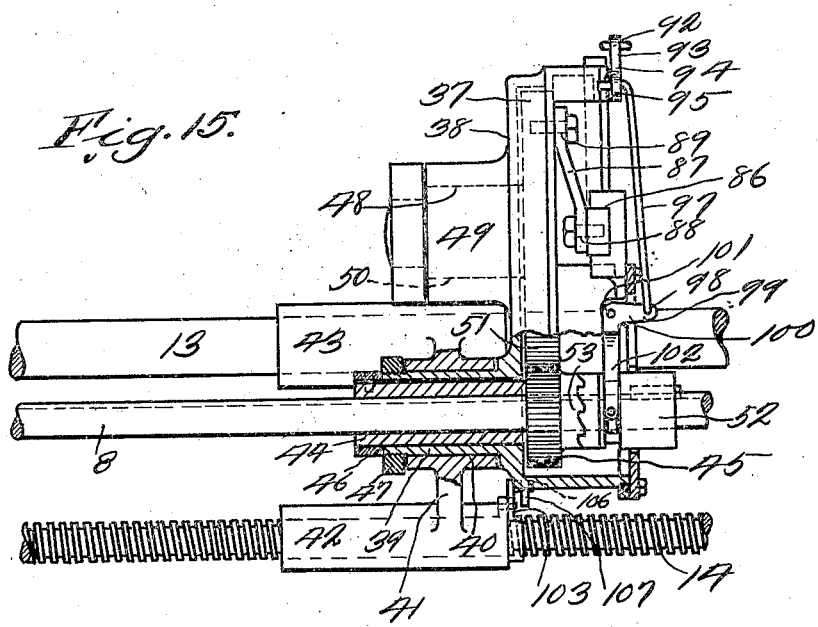
Figure 15 is a rear view of the carriage, part being broken away to better show the structure.
Figure 16:
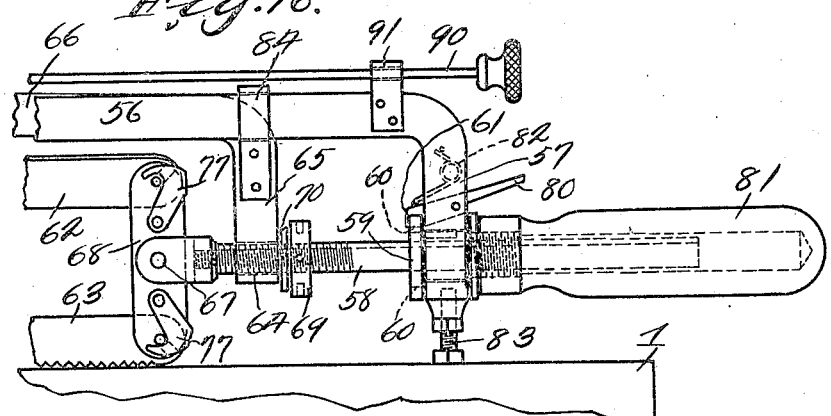
Figure 16 is a side elevation of the free end of the severing element frame.
Figure 17:
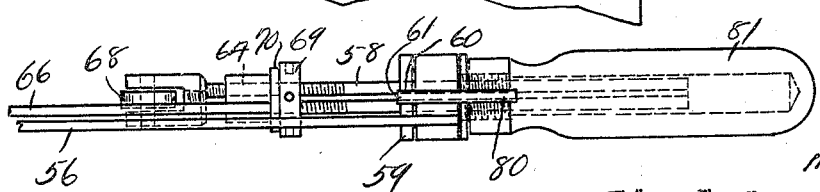
Figure 17 is a top plan view of the free end of the severing element frame.

The carriage 37 comprises a casing 38, which is pivotally mounted on the drive shaft 8 as a center and is provided with a sleeve 39 rockably mounted in a bearing 40 of a bracket 41, said bracket being provided with sleeves 42 and 43. The sleeve 43 is slidably mounted on the guide rod 13, and the sleeve 42 slidably mounted on the feed screw 14, therefore it will be seen that the carriage as a whole may be moved from side to side and guided in its movement. Extending into the sleeve 39 of the casing 38 is a sleeve 44 carried by a gear 45, which gear and sleeve are rotatably mounted on the drive shaft 8 and said gear is held against outward movement out of the chamber of the casing 38 by means of the collar 46 which engages the outer end of the sleeve 39. However to further insure against displacement a collar 47 is threaded on the sleeve 39. Rotatably mounted in a bearing 48 of a boss 49 carried by the casing 37 is a stub shaft 50, the inner end of which stub shaft is provided with a gear 51 which meshes with the gear 45, which is rotatably mounted on the shaft 8. It will be seen that as the constantly driven shaft 8 rotates that the gears 45 and 51 will not rotate, however when it is desired to rotate said gears 45 and 51 the clutch member 52 which is slidably keyed on the drive shaft 8 is moved inwardly to the position shown in Figure 15 and into engagement with the clutch element 53 carried by the gear 45, at which time the gear 45 will be locked to and rotate with the drive shaft 8. Secured to the upper end of the casing 38 at 55 is the severing element frame 56, which frame extends over the block 1 and terminates in a downwardly extending arm 57, in the lower end of which is rotatably mounted a shaft 58 having a disc 59 provided with notches 60, oppositely disposed, for the reception of a spring actuated detent 61, by means of which detent the shaft 58 which carries the knife blade 62 and the saw 63, may be held with the knife blade or the saw 63 in downward position for severing meat or for sawing bone and the like. The shaft 58 has its inner end extending through an aperture 64 in the downwardly extending arm 65 of the auxiliary reciprocating frame 66, and connected at 67 to knife blade and saw blade carrying member 68, there being lock nut 69 and washer 70 for forcing the shaft 38 outwardly and tightening the knife blade 62 and the saw 63, the inner ends 71 of which are connected to the bar 72, which bar is provided with a shaft 73, rotatably mounted in a bearing 74 of the vertical portions 75 of the reciprocated frame 66, there being a spring actuated detent 76 for preventing easy displacement of the device during an adjusting operation. The severing blade 62 and the saw 63 are detachably connected by means of pivoted hooks 77 to the member 68 and by means of lugs 78, which engage in slots 79 to the bar 72. It will be seen that the blades 62 and 63 are positively held and that when it is desired to reverse the positions of the blade 62 and the saw 63, the operator places his finger on the end 80 of the pivoted detent 61 and forces the same downwardly, at the same time rotating the handle 81 until the opposite notch 60 in the disc 59 receives the spring actuated detent 61 which is forced downwardly by the coiled spring 82. Threaded into the lower end of the arm 57 is a supporting leg 83 by the adjustment of which the knife blade 62 or the saw 63 may be limited in its downward movement during a meat severing operation by engagement with the upper face of the block 1, thereby preventing damage to the knife blade, saw blade or to the block 1. The reciprocating frame 66 is slidably supported on the frame 56 by means of a bracket 84, which bracket prevents pivotal action of the frame 66 and guides the same during its reciprocation. The rear end of the reciprocating frame 66 terminates in a horizontally disposed bar 85, which is slidably mounted in bearings 86 of the casing 38 of the carriage and is reciprocated by means of a pitman 87, one end of which is pivotally connected at 88 to the bar 85 and the other end at 89 to the gear 51 at a point to one side of a center thereof. It will be seen that when the clutch member 52 is in mesh with the clutch member 53, thereby imparting rotation to the gear 51 through the gear 45 that during the rotation of the gear 51, the pitman 87 will cause the bar 85 to reciprocate and consequently cause the reciprocating frame 66 to reciprocate, thereby simulating a sawing or cutting operation, at which time the operator may if he so desires force the handle member 81 downwardly, further controlling the severing or sawing operation. The clutch element 52 is controlled from a point adjacent the handle 81 by means of the push rod 90, which is slidably mounted in bearing 91, loosely, and has its inner end pivotally connected at 92 to the arm 93 of a bell crank lever 94. The bell crank lever 94 has its arm 95 rearwardly extending and pivotally connected at 96 to a downwardly extending connecting rod 97. The connecting rod 97 has its lower end pivotally connected at 98 to the arm 99 of the bell crank lever 100, which is pivoted at 101 in the casing 38 and has its bifurcated arm 102 extending downwardly and cooperating with the clutch element 52. It will be seen that the operator by forcing the rod 90 inwardly will throw the clutch element 52 into engagement with the clutch element 53, thereby starting a reciprocation of the frame 66 for meat severing purposes. When the rod 90 is pulled outwardly the clutch element 52 is declutched, thereby stopping the reciprocation of the frame 66.

The carriage 37 is moved longitudinally by the feed screw 14 when said feed screw is rotated and the spring actuated dog 103 engages between the thread thereof. The spring actuated dog is pivoted to the bracket 41 at 104 and is normally held in engagement with the feed screw by means of the spring 105 with its arm 106 upwardly extending and in a position where, when the carriage is tilted rearwardly on the shaft 8 as a pivotal point, the lug 107 carried by the casing 38 will engage the arm 106 of the pivoted dog and move the same out of engagement with the feed screw 14, thereby allowing the carriage to be moved longitudinally independently of the rotation of the feed screw 14 to any desired position, where the severing element will be disposed above meat to be severed on the block 1. Lug 107 however is positioned whereby the carriage may be tilted without engaging the arm 106, thereby allowing the severing element to assume an inclination during a meat severing operation without disengaging the dog 103, said dog being only disengaged by an extreme tilting action of the carriage 37. The clutch element 52 is slidably keyed on the drive shaft 8, therefore it will be seen that the carriage may move longitudinally on the feed screw 14, drive shaft 8 and guide rod 13 without interference.

It will be seen that it is necessary to move the carriage 37 intermittently when a plurality of slices of meat are being severed, therefore it will be obvious that an intermittent rotation of the feed screw 14 is essential and that the amount of rotation of the feed screw will regulate or determine the thickness of the slice of meat. To accomplish this result the feed screw controlling mechanism 108 is provided. The end 9 of the drive shaft 8 has secured thereto a disc 109 which disc is provided with a recess 110 having an inclined bottom 111, said disc rotating constantly with the drive shaft 8. Loosely mounted and rotatable on the outer end of the shaft 8 is a member 112 in which a sliding bolt 113 is mounted which bolt is normally forced inwardly by means of the coiled spring 114 which engages the lug 115 carried by said bolt. The end 116 of the sliding bolt being adapted to be forced into the recess 110 of the disc for locking the disc 109 and the member 112 together. The lug 115 is normally in abutment with the trip arm 117 and the bolt out of interlocked engagement with the disc 109 against the action of the spring 114 and out of engagement with the end 118 of the recess 111. When the trip arm 117 is raised by a pull on the trigger 119 through the slide 120 against the action of the spring 121 through the medium of the foot pedal 122 carried by rearwardly extending arms 123 which are pivoted at 124 to the rear legs 2 of the block 1 and has a connecting rod connection 125 to a bell crank lever 126, which bell crank lever is connected by means of a connecting rod 127 to the slide 120, the sliding bolt 113 under the influence of the spring 114 engages the shoulder 118 of the recess 111 of the disc 109 and causes the member 112 to turn in unison with said disc 109. In raising the trip arm 117 by the pull on the trigger 119, the inner end 128 adjacent the trigger's pivotal point 129 strikes the stop 130 which raises the free end of the trigger 119 and releases the trip arm 117 for return to original position before the disc 109 makes a complete revolution. Just before the disc 109 completes its revolution, the lug 115 of the bolt 113 contacts with the angled face portion 131 of the trip arm 117 and causes the bolt 113 to be retracted and the members 112 and 109 declutched, the declutching thus taking place automatically. The member 112 has pivoted thereto eccentrically at 132 a connecting rod 133, the other end of which is pivotally connected at 134 to a bar 135 which is slidably mounted in a bearing of the plate 11, therefore it will be seen that as the member 112 revolves that the slidable bar 135 is reciprocated. Slide bar 135 is provided with a pin 136 which extends through an elongated aperture 137 in a segment 138, said segment being pivotally mounted at 139 to the plate 11. The pin 136 engages any of the surfaces 140 of a notched cam 141, which cam is disposed on the inside of the segment 138 and may be rotatably adjusted for positioning any of the surfaces 140 in registration with the lug 136 by means of a thumb engaging member 142, said cam being in tight engagement with the inner side of the segment 138, thereby insuring the cam against displacement after being adjusted. The surfaces 140 of the cam 141 are at different distances from the axis of the cam, therefore it will be seen that the downward movement of the segment 138 in the direction of the arrow $a$, Figure 6, on its pivotal point 139 will be varied according to the position of the cam and the particular surface 140 in relation to the pin 136 and therefore imparting varying amount of rotation to the feed shaft 14 through the gear train 143 and ratchet 144 and pawl 145 connection with the feed screw 14, said ratchet and pawl portion of the connection forming means whereby retrograde movement of the feed screw 14 is prevented when the sector 138 is returned to normal position as shown in Figure 6 under the influence of the lug 136. The trigger 119 is normally forced downwardly by the leaf spring 146 and the trip arm is normally forced downwardly by the coiled spring 147, thereby insuring a positive operation of the parts.

From the above it will be seen that a meat severing machine is provided which is positive in its operation, may be easily and quickly handled and one wherein successive slices of meat of uniform thickness may be obtained, or slices of varying thickness as desired.

The invention having been set forth what is claimed as new and useful is:—

1. The combination with a meat severing machine comprising a traversing carriage, a meat severing element carried by said carriage, a feed screw for intermittently moving said carriage, of means for rotating said screw, and adjustable cam means whereby said screw will be allowed to rotate a predetermined amount.

2. The combination with a meat severing machine comprising a traversing carriage, a severing element carried by said carriage, said carriage being slidably mounted on a driven shaft having operative connection with said severing element, a feed screw for intermittently moving said carriage and on which the carriage is slidably mounted, means whereby said feed screw will be rotated a predetermined amount, and clutch connections between said last named means and the driven shaft.

3. The combination with a meat severing machine comprising a traversing carriage, a meat severing element carried by said carriage, a feed screw for moving said carriage, a driven shaft in parallel relation to the feed screw and extending through the carriage, means whereby said feed screw may be rotated a predetermined amount from the driven shaft, and means for controlling said last named means.

4. A meat cutting machine comprising a traversing carriage, a severing element carried by said carriage, a feed screw of which said carriage is slidably mounted, a constantly driven shaft extending through said carriage and in parallel relation to the feed screw, a member carried by the carriage and engaging the thread of the feed screw whereby said carriage will be moved when the feed screw is rotated, and means whereby the feed screw may be rotated a predetermined amount through clutch connection with the driven shaft.

5. A meat cutting machine comprising a driven shaft, a feed screw in parallel relation to the driven shaft, a carriage mounted on the driven shaft and feed screw, a severing element carried by said carriage, a connection between the carriage and the thread of the feed screw, said driven shaft being constantly driven, and means cooperating with the driven shaft and the feed screw whereby said feed screw may be rotated a predetermined amount.

6. A meat cutting machine comprising a driven shaft, a feed screw, a carriage movable by said feed screw, a severing element carried by said carriage, said driven shaft being constantly driven, and means cooperating with the driven shaft and the feed screw whereby said feed screw may be rotated a predetermined amount.

7. A meat cutting machine comprising a driven shaft, a feed screw, a carriage moved by said feed screw, a severing element carried by the carriage, said severing element being reciprocated by the driven shaft, and means cooperating with the driven shaft and the feed screw whereby said feed screw may be intermittently rotated predetermined amounts.

8. A meat severing machine comprising a driven shaft, a feed screw, a carriage moved by the rotation of said feed screw, a reciprocating severing element carried by the carriage, said severing element being reciprocated through connections with the drive shaft, means cooperating with the drive shaft and the feed screw whereby said feed screw may be intermittently rotated, and means whereby the feed screw rotation may be limited to predetermined amounts.

9. A meat severing machine comprising a driven shaft, a feed screw, a carriage moved by the rotation of said feed screw, a reciprocating severing element carried by the carriage, gear and pitman connections between the severing element and the driven shaft, whereby said severing element will be reciprocated, means cooperating with the shaft and feed screw whereby said feed screw may be intermittently rotated, and cam means whereby the rotation of the feed screw may be limited to predetermined amounts.

10. The combination with a traversing carriage of a meat severing machine, a severing element mounted on said carriage, said carriage being slidably mounted on a feed screw, a pivoted dog connection between the carriage and the feed screw, a constantly driven shaft extending through the carriage and on which the carriage is slidably and pivotally mounted, operative connection between said shaft and the severing element, of a lug carried by said carriage and positioned spaced from the pivoted dog but in the path thereof and forming means whereby upon normal pivotal action of the carriage the lug will not engage the dog but upon extreme pivotal action of the carriage said dog will be disengaged by the lug.

11. The combination with a meat severing machine comprising a carriage, a severing element carried by said carriage, a constantly driven shaft, driving connection between said shaft and the severing element, a feed screw for intermittently moving said carriage, of means cooperating with said constantly driven shaft and the feed screw whereby said feed screw will be intermittently moved, said means comprising a pivoted sector, a cam member carried by said sector and pivoted thereto, a slidable bar, a lug carried by said bar and cooperating with said cam, gear and ratchet connections between the sector and the feed screw, a clutch cooperating with the driven shaft and normally inoperative, a pivoted member for holding said clutch inoperative, means for throwing the clutch into operative position for allowing a rotation thereof, means for controlling the clutch from a remote point, and means for returning the sector to normal position.

12. The combination with a constantly driven shaft and a feed screw controlling the movement of a meat severing machine carriage, of a reciprocating severing element carried by said carriage, operative connection between said driven shaft and the severing element, means for intermittently rotating the feed screw, said means comprising a normally disengaged clutch carried by the driven shaft, a pivoted sector, a slidable bar adjacent said sector, means carried by the bar and sector for limiting the movement of the sector and for moving the sector, a pitman connecting the bar to the clutch, gear and ratchet connections between the sector and the feed screw, and means for controlling the clutch for imparting intermittent rotation of the feed screw.

13. The combination with a meat severing machine comprising a carriage, a severing element carried by said carriage, a constantly driven shaft having operative connection with the severing element, a feed screw for moving said carriage, of means clutch controlled and connecting the shaft and the feed screw whereby said feed screw may be intermittently rotated a predetermined amount.

14. The combination with a meat severing machine comprising a carriage, a severing element carried by said carriage, a constantly driven shaft having operative connection with the severing element, a feed screw for moving said carriage, of clutch controlled means connecting the ends of the shaft and the feed screw whereby said feed screw may be intermittently rotated a predetermined amount.

15. The combination with a meat severing machine comprising a carriage, a severing element carried by said carriage, a constantly driven shaft having operative connection with the severing element, a feed screw for moving said carriage, of means for intermittently rotating the feed screw a predetermined amount, said means comprising a clutch carried by the driven shaft, a pivoted sector, gear and ratchet connections between the sector and the feed screw, spring means for normally operating the clutch, a spring actuated arm for holding the clutch declutched, means for controlling said arm, a slidable bar, a cam carried by the sector, a lug carried by the bar and positioned to engage the cam, and a pitman connection between the slidable bar and the clutch.

16. The combination with a traversing carriage of a meat severing machine, said carriage being slidably mounted on a constantly driven shaft, means for moving said carriage intermittently, a reciprocating severing element carried by the carriage, said severing element being carried by a slidably mounted bar in the carriage, of means for reciprocating said slidably mounted bar, said means comprising a gear, a pitman connection between the gear and the bar, a gear rotatably mounted on the driven shaft, a clutch element carried by said last named gear, a clutch element slidably keyed on the driven shaft and cooperating with the gear carried clutch, and means for controlling said slidably keyed clutch element from a remote point.

17. The combination with the carriage of a meat severing machine, a reciprocating severing element carried by said carriage, said carriage being slidably mounted on a constantly driven shaft having operative connection with the severing element, said carriage having a connection with a feed screw, a spring actuated pivoted dog carried by the carriage and cooperating with the thread of the feed screw, of means for disengaging said pivoted dog, said means comprising a lug carried by the carriage in the path of the pivoted dog, said carriage being pivotally mounted on the constantly driven shaft.

18. The combination with a meat severing machine carriage, said carriage being slidably mounted on a constantly driven shaft, of a meat severing element carried by said carriage, said meat severing element being supported in a reciprocating frame, said reciprocating frame being slidably mounted in bearings of the carriage, a gear rotatably mounted in the carriage, a pitman connection between the gear and the carriage and located within the carriage, a gear rotatably mounted on the driven shaft, clutch connections between the driven shaft and said last named gear, and means for controlling said clutch from adjacent the outer end of the reciprocating frame.

19. A meat severing machine comprising a traversing carriage, a reciprocating severing element carried by said carriage, a constantly driven shaft having operative connection with the severing element, a feed screw for intermittently moving said carriage, means connecting the feed screw and the driven shaft whereby said feed screw will be intermittently rotated a predetermined amount, a driving motor for said driven shaft, gear connections between said driving motor and the driven shaft, a countershaft adjacent said gear connections, and gear and clutch connections between the countershaft and the first mentioned gear connections whereby said countershaft may be operated as desired.

20. The combination with a meat severing machine comprising a traversing carriage, a reciprocating severing element carried by said carriage, a constantly driven shaft having operative connection with the severing element and on which the carriage is slidably mounted, an intermittently driven feed screw on which the carriage is slidably mounted, connecting means between the carriage and the feed screw, and means controllable by tilting of the carriage whereby said connection between the carriage and the feed screw may be disconnected.

21. The combination with a meat severing machine comprising a traversing carriage, a reciprocating severing element carried by said carriage, a constantly driven shaft having operative connection with the severing element and on which the carriage is slidably and pivotally mounted, a feed screw, a detachable connection between the feed screw and the carriage, and a member carried by the carriage and cooperating with the detachable connection upon pivotal movement of the carriage whereby said detachable connection will be detached.

22. A meat severing machine comprising a traversing carriage, a reciprocating severing element carried by said carriage, a constantly driven shaft having operative connection with the severing element, a feed screw for said carriage, a motor, a gear connection between the motor and the driven shaft, a clutch controlled connection between the driven shaft and the feed screw whereby said feed screw may be intermittently rotated, said carriage being slidably and tiltably mounted on the driven shaft, and detachable means connecting the carriage to the feed screw, said detachable means being controllable by tilting the carriage.

23. A meat severing machine comprising a traversing carriage, a reciprocating severing element carried by said carriage, a constantly driven shaft having operative connection with said severing element, a feed screw for the carriage, a clutch carried by the driven shaft, a sector, a gear and ratchet connection between the sector and the feed screw, and means actuated by the clutch when in operation whereby the sector will be moved a predetermined distance and restored to normal position upon a rotation of the clutch.

In testimony whereof I affix my signature.

JOHN A. BAUMGARTNER.